United States Patent [19]

Buszkiewicz et al.

[11] 4,287,777
[45] Sep. 8, 1981

[54] SEMI-AUTOMATIC CONTACT INSERTION TOOL

[75] Inventors: Bruno C. Buszkiewicz, Chicago; Joseph A. Storcel, North Riverside, both of Ill.

[73] Assignee: Bunker Ramo Corporation, Oak Brook, Ill.

[21] Appl. No.: 9,909

[22] Filed: Feb. 6, 1979

Related U.S. Application Data

[60] Division of Ser. No. 868,945, Jan. 12, 1978, Pat. No. 4,156,965, which is a continuation of Ser. No. 722,674, Sep. 13, 1976, abandoned.

[51] Int. Cl.$^3$ ............................................. G05G 17/00
[52] U.S. Cl. ............................................. 74/2; 74/110
[58] Field of Search ................ 74/2, 110; 124/27, 37, 124/41 R

[56] References Cited

U.S. PATENT DOCUMENTS

| 71,162 | 11/1867 | Hall | 124/27 |
|---|---|---|---|
| 362,096 | 5/1887 | Lewis | 124/27 |
| 1,206,865 | 12/1916 | Lefever | 124/27 |
| 1,240,987 | 9/1917 | Lefever | 124/27 |
| 1,874,460 | 8/1932 | Cox | 74/2 X |

FOREIGN PATENT DOCUMENTS

| 65680 | 9/1947 | Denmark | 124/37 X |
|---|---|---|---|
| 285217 | 6/1913 | Fed. Rep. of Germany | 124/27 |
| 489648 | 1/1954 | Italy | 124/27 |
| 1022230 | 3/1966 | United Kingdom | 124/37 |

Primary Examiner—Allan D. Herrmann
Attorney, Agent, or Firm—F. M. Arbuckle; J. R. Hoffman

[57] ABSTRACT

Apparatus is shown for use in loading contacts in contact receiving bores of a resilient insert body. The insert body is provided with internal shoulders and bores forming restrictive passages for holding the contacts and for holding wires attached to the contacts. The apparatus includes an adapter associated with a breech loading assembly for accepting and holding the insert body. An assembly including a bullet within a barrel is pushed into the insert body to gently enlarge the shoulders and the bores. The bullet is then retracted to a stop position, leaving the barrel in place in the bore. The breech lock is then opened and contacts are loaded by hand, or other means, into the bore to the stop position. The barrel is then retracted from the bore permitting the internal shoulders of the resilient insert body to expand and grip the contacts. Thereafter, the resilient insert body, with its contacts and appropriate leads in place, is removed from the apparatus.

5 Claims, 7 Drawing Figures

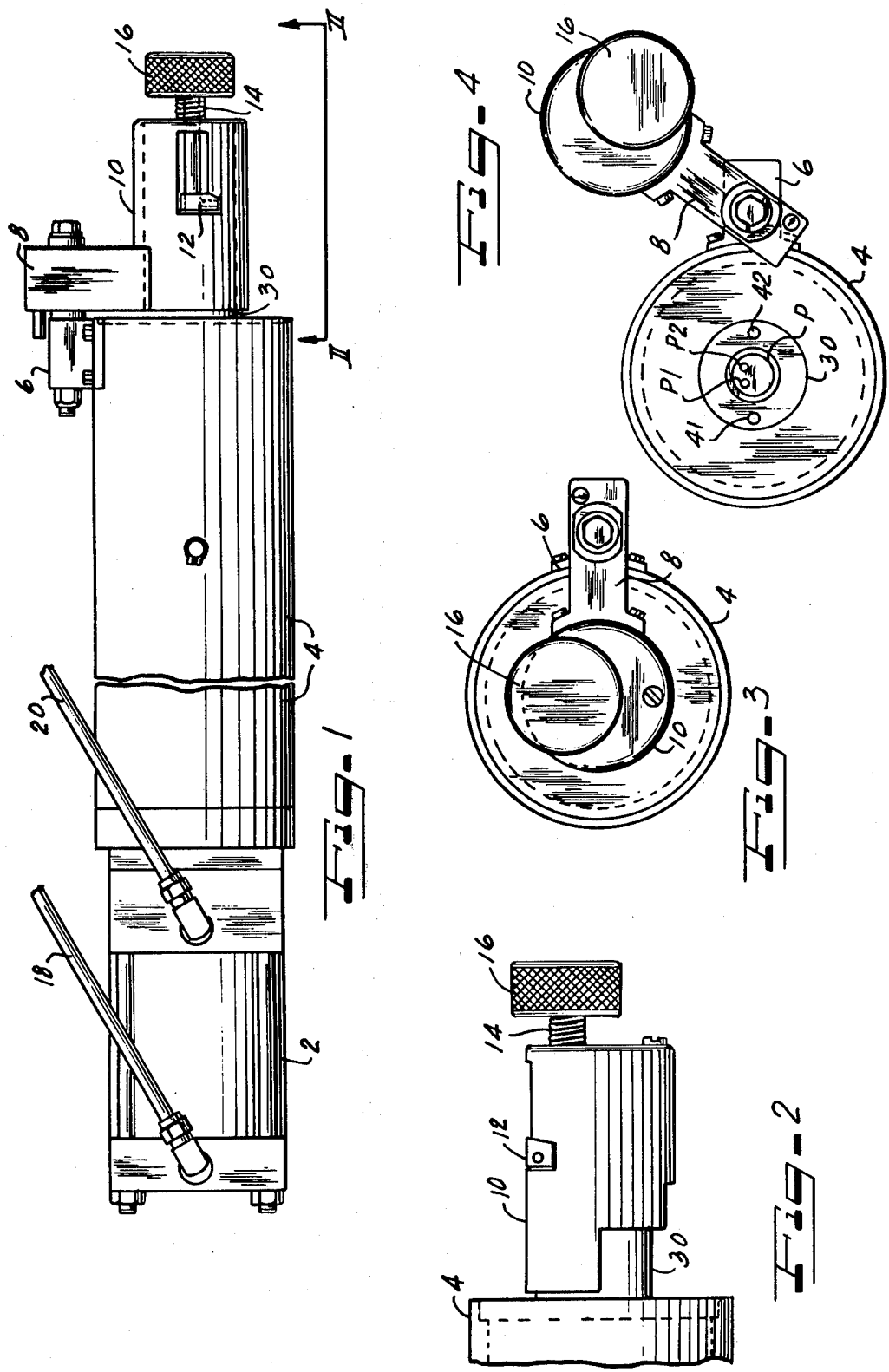

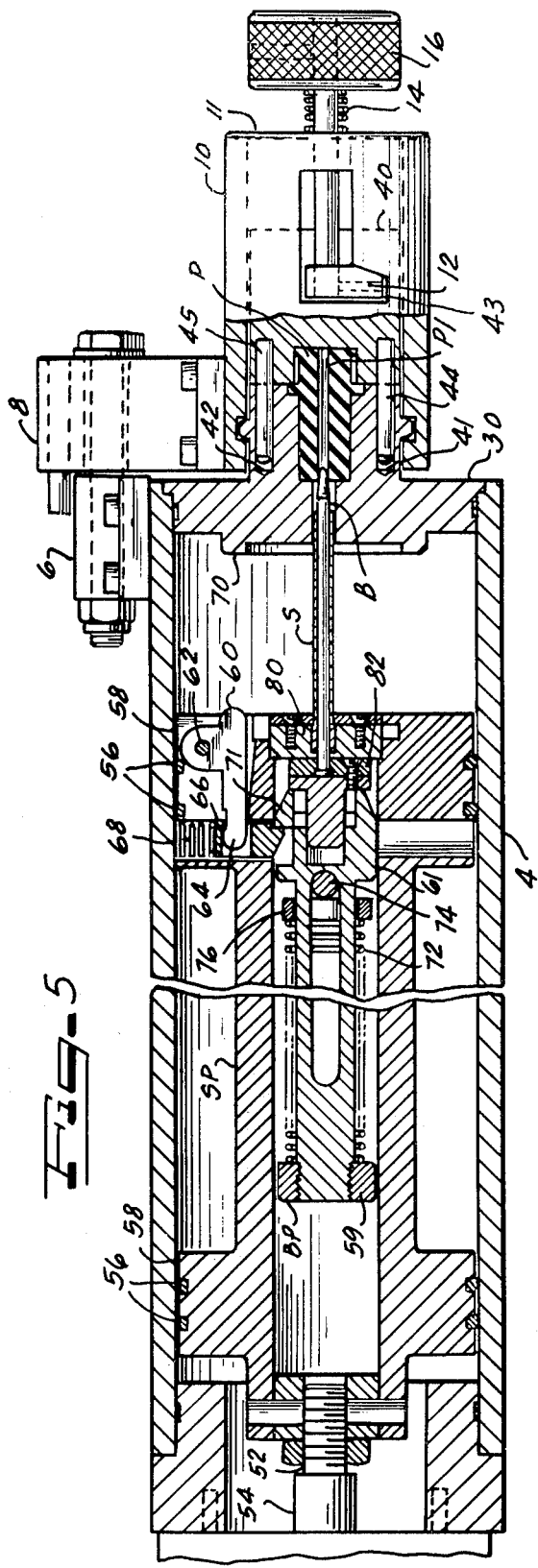
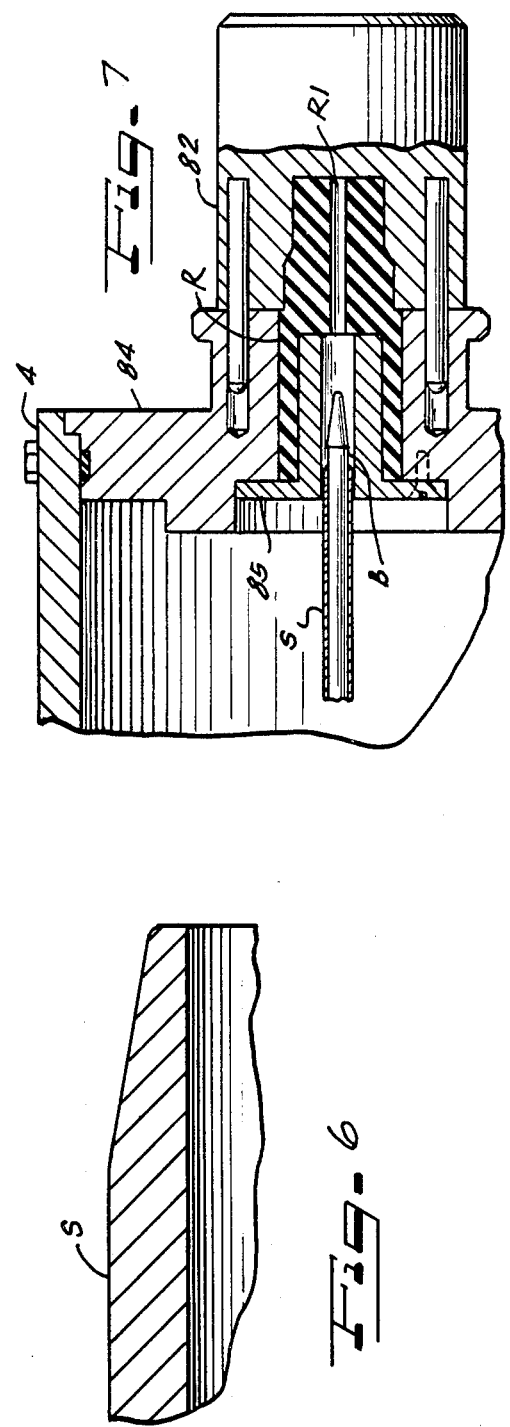

SEMI-AUTOMATIC CONTACT INSERTION TOOL

This is a divisional application of application Ser. No. 868,945, filed Jan. 12, 1978, now U.S. Pat. No. 4,156,965, which was a continuation of Ser. No. 722,674, filed Sept. 13, 1976, now abandoned.

BACKGROUND OF THE INVENTION

1. Field of the Invention

The present invention relates to the manufacture of electrical connectors. It particularly relates to the provision of semi-automatic apparatus for use in inserting contacts into resilient insert connector bodies.

2. Summary of the Prior Art

Some prior art machines for use in loading contacts into resilient connector bodies or shells include devices which force the contacts into the shells. Such devices have not included opening means for gently opening the internal bores of the connector shell, extracting a part of the opening means, inserting a contact and then removing the remainder of the opening means gently to avoid harm to the connector. It is apparent, therefore, that these prior art devices are not such as to work well with certain connectors and connector shells which require gentle treatment.

Other prior art machines are known which include apparatus of use to expand the internal bores of connector shells. Contacts are inserted then in the expanded bores and the expansion apparatus is removed, allowing the internal walls of the bores to contract and hold the contacts. These prior art machines generally have not included means enabling quick insertion and removal of connector shells, rapid expansion of bores in the shells under control of an operator, nor ready insertion of contacts by application of near zero insertion forces. They do not appear to involve apparatus such as a breech lock to support adapters which retain connector shells while contacts are inserted.

SUMMARY OF THE INVENTION

In view of the foregoing, it is a primary object of the invention to provide an improved machine or apparatus for use in inserting contacts into contact receiving bores in resilient connector bodies. It is a further object to provide an improved contact insert apparatus or tool to enable the insertion of contacts in resilient connector bodies without damage to the contacts or to the bodies or to internal shoulders, restricted passages or seals in said bodies. It is yet another object to provide an improved contact insert tool which is operable by means of air pressure which enables speedy and efficient operation of the tool. It is still a further object to provide means enabling an operator to quickly and reliably install contacts in a resilient connector body by use of near zero insertion force and with minimal fatigue.

To attain the foregoing objects and others ancillary thereto, a contact loading machine according to the present invention is provided to enable contact receiving bores in resilient connector bodies to receive and retain contacts and wires attached to the contacts. The machine includes a housing and a breech loading assembly for receiving and holding the connector body. To load the machine, or position a resilient connector body in the machine, the breech loading assembly is pivoted sideways to expose a first adapter in the housing and a second adapter in the breech loading mechanism. A resilient connector body is then placed in the first adapter and the breech loading assembly is pivoted back in place to secure the connector body between the first and second adapters. A first plunger or piston of a dual-piston device is provided within the housing to support a bullet shaped insert device and a second plunger or piston which is coaxial with the first and outside the first is provided within the housing to support a sleeve, or barrel, in a position outside the bullet and coaxial therewith. The pistons or plungers are controlled by air pressure and are used by an operator to push the bullet and barrel, the bullet having its pointed end first, into a bore in the resilient connector body to gently enlarge the bore. A spring is released when a lever reaches a predetermined position to activate the first plunger and retract the bullet to a stop position, leaving the barrel in the bore. The breech loading assembly is then pivoted sideways again, exposing the end of the resilient connector body with the sleeves inside exposed. A contact may then be pushed within the bore, by hand or other means, to the stop position. Air pressure is then used to activate the second plunger and retract the barrel from the bore, releasing the internal shoulders and permitting them to grip the contact. The connector body, complete with contacts, may then be removed from the machine.

BRIEF DESCRIPTION OF THE DRAWINGS

The above mentioned and other features and objects of this invention and the manner of obtaining them will become more apparent, and the invention itself will be best understood by reference to the following description of an embodiment of the invention taken in conjunction with the accompanying drawings, in which:

FIG. 1 is a view in elevation of a machine in accordance with the invention,

FIG. 2 is a side view of a portion of the embodiment of FIG. 1, taken along line 2—2, showing an external view of the breech lock mechanism, FIG. 3 is an end view of the embodiment of FIG. 2, in its closed state, FIG. 4 is an end view of the embodiment of FIG. 2 illustrating the breech lock assembly in its opened state, FIG. 5 is a sectional view of an embodiment of the invention according to FIG. 1, FIG. 6 is a sectional view showing a taper characteristic of the end of the barrel, and FIG. 7 is a sectional view of a portion of the apparatus of FIG. 5 in which apparatus to retain a receptacle has been substituted for the apparatus to retain a plug.

DESCRIPTION OF PREFERRED EMBODIMENTS

Turn to FIG. 1 for a view in elevation of a machine in accordance with the invention. In this view, an air cylinder is indicated at 2 in association with a housing 4 and a breech lock mechanism including a bracket 6, arm 8, cylinder 10, latch 12, spring 14 and handle 16.

The air cylinder 2 is shown to have two external connections 18, 20 which connect to a valve (not shown) which may be controlled by an operator's foot or other means and which controls the flow of air under pressure to opposite sides of a piston (not shown) in the cylinder. The air supplied through 18,20 is used to drive the piston in a selected direction in the cylinder. As will be clearer from the further description, movement of the piston is used to drive mechanisms in the housing 4 to desired positions to open and close the bores in a connector, enabling the bores to be expanded to receive contacts without the use of force and subsequently to be contracted to secure the contacts in place.

The breech lock mechanism is shown in FIGS. 1, 2, 3 in a position enabling it to retain a portion of a connector in juxtaposition to the housing 4 while the air controlled mechanism in the housing 4 is operated to penetrate bores internal to the connector. Subsequently, the breech lock may be released from the position illustrated in FIG. 3 and moved to the open position shown in FIG. 4 permitting access to the connector so that contacts may be inserted with zero insertion force to a stop point in the connector. After the contacts have been placed, operation of the air cylinder to its alternative position will cause inserts in the bores to be removed and the contacts, with any associated electrical wiring, to be secured by the connector.

FIG. 2 is a side view of a portion of the apparatus of FIG. 1, taken along line 2—2, showing an external view of the breech lock mechanism 10, 12, 14, 16 in its closed state. In this view, portions of a fixed adapter plug connector 30 and the housing 4 are shown.

FIG. 3 is an end view of the disclosure of FIG. 2 showing further details of the breech lock assembly in its closed condition.

FIG. 4 is an end view of the disclosure of FIG. 2 showing the breech lock assembly in its opened state. The opened state has been achieved by turning the handle 16 clockwise to disengage the latch 12, moving a sliding adapter plug 40 (FIG. 5) fully into the breech lock and turning the breech lock assembly clockwise into the position shown in FIG. 4. In this view, the end of the fixed adapter plug connector 30 is indicated. The sliding adapter 40, as shown elsewhere in this disclosure, is mated to the fixed adapter 30 when the breech lock is closed and provides a receptacle for a plug connector P to secure P at the time when the air controlled mechanism is pressed into P. The circles at P1, P2 in the plug P designate openings available to receive contacts and wiring to the contacts. The circles 41, 42 in the fixed adapter 30 designate holes which receive alignment pins of the sliding adapter 40.

FIG. 5 is a sectional view of a portion of the apparatus corresponding to the view shown in FIG. 1. In this view, a sleeve plunger SP and a bullet plunger BP are shown positioned to share a common axis within the walls of the housing 4. The sleeve plunger SP is coupled by coupling means 52, 54 to the air cylinder 2 so that air to the air cylinder, as controlled by an operator, can be used in the control of SP and also BP.

The sleeve plunger SP is supported within the walls of the housing 4 by suitable lubricated troughs indicated at 56 between faces at 58 of the piston. This enables the sleeve plunger to move back and forth within the housing wall. The bullet plunger is supported within internal walls of the sleeve plunger by retainers at 59, 61 which makes it possible for the bullet plunger to move back and forth within the walls of the sleeve plunger.

The sleeve plunger SP supports a sleeve, or tube, S. The bullet plunger BP supports a contact positioning pin or bullet B. As shown in FIG. 5, when the system is at rest, the bullet B is positioned within the sleeve S. When air is supplied to the air cylinder 2 in a manner which drives the sleeve cylinder towards the right, the bullet plunger also is driven to the right by interaction between a pawl 66 which is carried by SP and the section 71 on the bullet plunger BP. As a result of this cooperative action, the bullet and sleeve will be carried to the right where they will penetrate into bores P1 in a connector plug P positioned in the fixed plug connector adapter 30.

Immediately after the sleeve and plunger penetrate into the bore of a plug P in the fixed plug connector adapter, the plunger BP is returned to its original position due to interaction as follows. In this connection it should be noted that the plunger SP includes lever means at 60 which is pivoted about a dowel pin at 62 so that an arm at 64 presses against a pawl 66 which is biased in the position shown by a spring 68. The lever 60 is arranged so that when the system is energized to force the sleeve plunger SP to the right, the lever will strike the face 70 of a fixed plug connector adapter 30 causing 60 to rotate about the dowel pin at 62 and press the pawl 66 upward against the action of the spring 68. This in turn will cause the lower portion of the pawl 66 to disengage the lip 71 of the plunger BP thereby releasing the plunger BP. It will be seen that the plunger BP is associated with a spring 72 which is captive between retainer means 59 and a washer at 76. The washer 76 rides against the fixed stop 74 so that the spring is compressed as the plunger BP moves to the right and therefore is able to move BP to the left when the latch between pawl 66 and section 71 of BP is released.

The sleeve, or tube, S remains in the bore of the plug after the bullet plunger BP has been returned to the position shown in FIG. 5. The sleeve in this way provides an opening in the bore P1 of the plug P into which a contact may be inserted to a stop point determined by the tip of the bullet B.

To prepare the apparatus so that the bore of the plug is accessible to receive contacts, the breech lock is opened by rotating the handle 16 clockwise, pulling it against the spring 14. This releases the sliding plug connector adapter 40, since the breech lock latch 12, which is seated in the slot 43 of the sliding adapter 40, pulls alignment pins 44, 45 out of the alignment holes 41, 42 in the fixed adapter 30 to pull the sliding adapter from the fixed adapter. The breech block, with the sliding adapter, can then be rotated to the position shown in FIG. 4. With the breech block out of the way, bores such as P1, P2 will be exposed and contacts, with electrical leads attached, may be placed in the bores by hand with the application of virtually no force. A convenient stop point against which the contacts may be lodged is presented by the tip of the bullet, or bullets B.

A preferred configuration for the tip of the sleeve S is shown in FIG. 6. This arrangement has been selected to provide ready access into the bore of a plug while minimizing the force applied to the plug and therefore the risk of damage to the plug.

After the contacts have been installed, the operator can retract the sleeve plunger SP and sleeve S by pressing a foot lever or other device (not shown) to energize the air cylinder 2. After the sleeve s has been retracted the bore will contract to capture the contacts and hold them securely. The resilient insert plug can then be extracted from the fixed plug connector adapter 30.

The fixed adapter 30 and sliding adapter 40 fit together as a pair. A particular pair will be used with two contact plugs and different pairs will be used with 3 contact plugs, 5 contact plugs etc.

The illustrated fixed adapter 30 and sliding adapter 40 of FIG. 5 are designed for use in the assembly of contacts into the plug-halves of connectors. Adapters of slightly different form, as indicated in FIG. 7, will be used for the receptacle-halves. Sleeves S and bullets B and their supporting elements at 80, 82 may also have to be replaced to compensate for different travel lengths as well as the requirement to penetrate different numbers of bores. It will be seen in FIG. 7 that a fixed receptacle connector adapter is indicated at 84, 85 which mates with a sliding receptacle connector adapter at 82 to retain a receptacle R. Appropriate barrels and sleeves indicated at B and S will be used to expand the bore or bores R1 in the receptacle connector R.

While the principles of the invention have been described above in connection with specific apparatus and applications, it is to be understood that this description is made only by way of example and not as a limitation on the scope of the invention.

I claim:

1. An apparatus for simultaneously moving a pair of members in a first direction and for thereafter moving one of the members in a second direction opposite to the first direction, said apparatus comprising:
   a fixed body;
   a first piston means coupled to a first member;
   a second piston means coupled to a second member;
   one said piston means being slidably mounted within the other said piston means;
   latching means for releasably connecting said first piston means and said second piston means together;
   means for moving said first and second piston means relative to said fixed body together in said first direction;
   biasing means arranged for urging one of said piston means in said second direction; and
   means for releasing said latching means and thereby cause said biasing means to move said one piston means in the second direction.

2. The apparatus as defined in claim 1 wherein said first piston means is slidably mounted within said second piston means and wherein said first member is coaxially disposed within said second member.

3. The apparatus as defined in claim 1 wherein said biasing means comprises a spring.

4. The apparatus as defined in claim 1 wherein said fixed body includes an abutment surface and wherein said releasing means includes a lever pivotably mounted to the other piston means and arranged to pivot upon engagement with said abutment surface for releasing said latching means.

5. The apparatus as defined in claim 4 further including a spring for loading said latching means for connecting said first and second piston means together and wherein said lever acts against said spring upon engaging said abutment surface for releasing said latching means.

* * * * *